Nov. 15, 1949  A. WYZENBEEK  2,487,915
FLEXIBLE SHAFT DRIVE
Filed Aug. 16, 1947
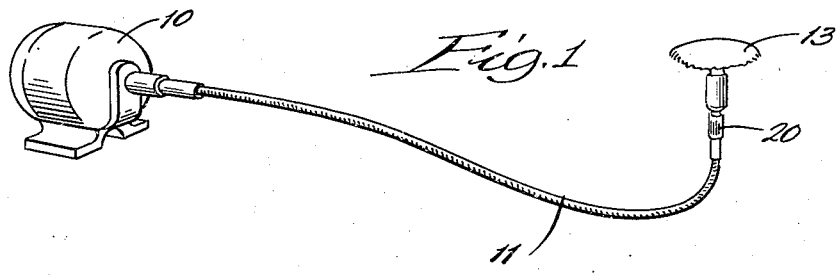
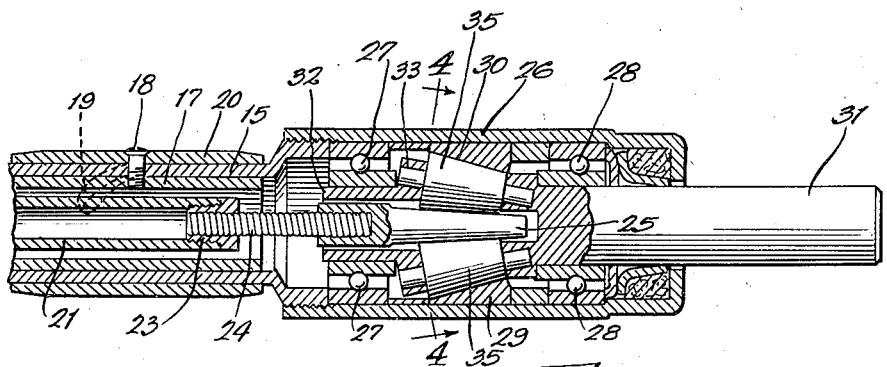
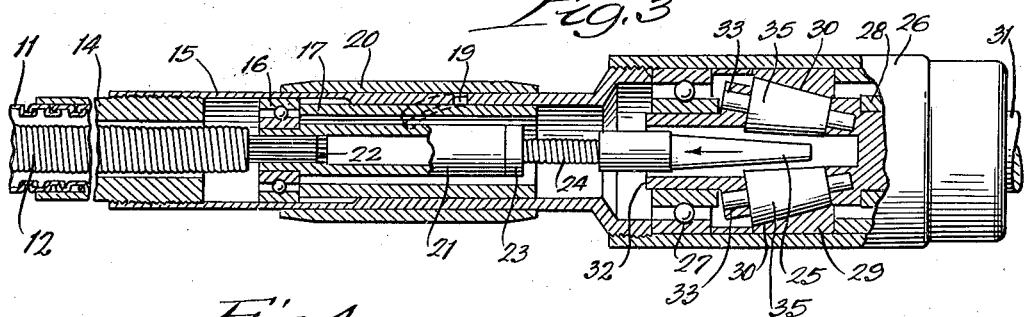
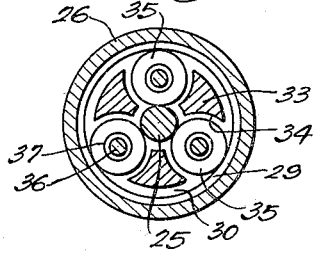
Inventor:
Andrew Wyzenbeek,
By Dawson, Booth and Spangenberg,
Attorneys.

Patented Nov. 15, 1949

2,487,915

UNITED STATES PATENT OFFICE 2,487,915

FLEXIBLE SHAFT DRIVE

Andrew Wyzenbeek, Chicago, Ill.

Application August 16, 1947, Serial No. 768,967

3 Claims. (Cl. 74—798)

1

This invention relates to a flexible shaft drive and is more particularly directed to the varying of the speed of a flexible shaft relative to a driven member connected to an operating tool.

It is desired to drive many different types of tools by means of a flexible shaft, such tools being means for brushing pots and pans, a polishing device for automobiles, and means for setting screws, nuts, etc. In such operations, it is important to have a relatively thin cable and flexible shaft to permit the ready manipulation of the same. However, the buffing or brushing device often has to be of relatively large diameter, and such a device, in operation, exerts relatively high torque upon the flexible shaft. A flexible shaft of the character described can carry a limited torque or load, and as a result, in the operation of such a tool, the shaft breaks frequently.

An object of the present invention is to provide a flexible shaft structure for driving a tool, the shaft being provided with means for changing the relative speeds of rotation of the tool and of the drive shaft, while at the same time providing a flexible and relatively small structure. Yet, another object is to provide a flexible shaft drive device, in which the torque imposed upon the flexible shaft is considerably reduced while effectively driving the tool. Yet, another object is to provide a small compact structure, in which a flexible shaft is rotated at high speed while driving a tool device at a lower speed, a resilient member being employed for bringing about a uniform control of the driven tool member. Yet, another object is to provide, in a flexible shaft structure employed for driving a tool, means for speeding up or reducing the speed of the driven member relative to the speed of rotation of the flexible shaft. Other objects and advantages will appear as the specification proceeds.

The invention is illustrated, in a single embodiment, by the accompanying drawing, in which—

Figure 1 is a perspective view of apparatus embodying my invention; Fig. 2, a broken longitudinal sectional view; Fig. 3, a broken longitudinal sectional view of the clutch and drive mechanism; and Fig. 4, a transverse sectional view, the section being taken as indicated at line 4 of Fig. 2.

In the illustration given, 10 designates a motor which may be of any suitable type or construction, and 11 designates a cable housing a flexible shaft 12. The motor cable and shaft are of well known construction and need not be described in detail herein.

2

The flexible cable drives through connections, which will be hereinafter described, a buffer or cleaner device 13, as illustrated in Fig. 1. The member 13 is merely set out as illustrative of the many types of tools which may be used.

As shown more clearly in Figs. 2 and 3, the cable 11 is secured at its outer end to a fitting 14 threadedly connected to a tubular casing 15. The casing 15 is provided with ball bearings 16. Secured to the ball bearings 16 is a sleeve 17, having secured thereto a pin or stud 18. The stud 18 extends through an inclined slot 19 in the casing 15 and also through an outer rotatable sleeve 20. Upon rotation of outer sleeve 20, the inner sleeve 17 is moved longitudinally by reason of the inclined slot 19 in the casing 15. Longitudinal movement of the sleeve 17 produces longitudinal movement of the bearings 16.

A tube member 21 is secured to the inner portion of the bearings 16 and is secured by the fitting 22 to the inner end of the flexible shaft 12. The opposite end of the tube 21 is provided with a nut 23, in which the end of a spring 24 is secured. The opposite end of the flexible spring 24 is secured within the hollow end of a tapered driving pin 25.

The tubular casing 15 is threaded at its forward end within an enlarged casing or drum 26. The drum 26 carries the bearings 27 and 28. The drum is also provided near its center with a fixed track 29, having its inner walls tapered inwardly and forwardly at 30.

The driven tool shaft 31 has a forward portion journaled within the bearings 28 and a rear tubular portion 32 journaled within the bearings 27. The drive pin 25 extends within the hollow portion of the member 31, as shown more clearly in Fig. 2. The member 31 is provided near its rear with an enlarged or tapered portion 33, having arcuate slots 34 extending therethrough and adapted to receive the tapered roller bearings 35. As shown more clearly in Fig. 4, the roller bearings 35 extend inwardly and outwardly of the slots 34. The outer surface of the bearings, as shown in Fig. 4, engage the inclined wall 30 on the inner side of the drum 26. The inner surfaces of the rollers 35 engage the tapered drive pin 25. In the illustration given, pins 36, which are fixed within the member 31, extend through enlarged openings 37 of the rollers 35, the lost motion between the pin and the enlarged openings permitting the rollers 35 to move inwardly and outwardly on contact with the tapered drive pin 25.

Operation

In the operation of the device, the motor 10 is set into operation by closing the usual switch and the shaft 12 rotates therewith. With the drive pin 25 in retracted position, the flexible shaft thus idles without causing any movement of the driven tool member 31. When the sleeve 20 is rotated so as to advance the inner sleeve 17, bearings 16 and inner tube member 21, the tapered drive pin 25 is brought into engagement with the three rollers 35. The flexible connector 24 enables the drive pin 25 to adjust itself to the space between the rollers 35 so as to fully engage each of the rollers with a full line contact on each roller. Even though the parts are not perfectly adjusted, or have been moved out of adjustment, the spring member 24 produces the desired contact so that the drive is accurate and complete for each of the rollers and the pin 25 has a full line contact with each roller. The clearances between the roller pins 36 and the rollers permit each of the rollers to move outwardly into engagement with the inclined wall 30 of the seat 29 of drum 26. As the relatively small drive pin 25 rotates, it causes each of the rollers to traverse a portion of the inner seat 29, and for each rotation of the small drive pin 25, there is a proportional part rotary movement of the member 31. The relative speed of the member 31 is reduced because for each rotation of the shaft or pin 25 the rollers 35 traverse only a portion of the annular wall 30 and therefore produce only a partial rotation of the member 31. Thus, the shaft 12 may be rotated at high speed to produce relatively slow rotations of the member 31 and the tool 13 carried thereby. Further, the torque or load, thus placed upon the rapidly rotating shaft, is greatly reduced.

When it is desired to stop the rotation of the tool, the operator simply rotates the sleeve 20 in the opposite direction so as to retract the inner tube 17 and tube 21 and thus to withdraw the tapered pin 25 from contact with the rollers 35.

It will be understood that the parts may be so proportioned as to get any desired reduction in speed or, if desired, to actually increase the speed of the driven element relative to the driving flexible shaft.

I find that the drive becomes unusually effective by reason of the resilient coupling member 24, which adjusts the tapered pin 25 readily and fully with respect to the three movable rollers 35 so as to produce a full line contact with each roller. This combination is effective even though the parts have been moved out of their initial position, or even if the parts are not accurately machined for proper alignment. The flexible element enables the drive pin to make its way between the rollers and to engage each of them with a full line contact.

While in the foregoing specification, I have set forth one structure in considerable detail for the purpose of illustrating an embodiment of the invention, it will be understood that the details may be widely varied by those skilled in the art without departing from the spirit of my invention.

I claim:

1. In a structure of the character set forth, a flexible shaft, a driven member adapted to be connected to a tool and having a hollow hub portion provided with slots, tapered roller bearings mounted in said slots and provided with axial openings, pins carried by said driven member and extending loosely through said openings and permitting limited radial movement of said bearings thereon, a drum enclosing said driven member and having an annular seat adapted to be engaged by said bearings, a frusto-conical member tapered for co-operation with said roller bearings and extending between said bearings for pressing the same outwardly against said drum, and a connector member joining said drive member to said flexible shaft, said connector member being resilient and capable of flexing in any radial direction.

2. In a structure of the character set forth, a flexible shaft, a casing provided with a slot disposed slantwise relative to the longitudinal dimension of said casing, a sleeve slidably mounted in said casing and connected to said flexible shaft, a rotary member carried by said casing, means connecting said rotary member and said sleeve through said slot in said casing operative to effect longitudinal movement of said sleeve upon rotation of said rotary member, a rotatable tapered drive pin, a resilient member flexible in any radial direction coupling said drive pin to said sleeve, a driven member, rotatable tapered bearings housed in said member and provided with axial openings, pins carried by said driven member and extending loosely through said openings permitting limited radial movement of said bearings thereon, and a drum having a tapered inner surface enclosing said driven member, said drive pin being operative when advanced by said sleeve into engagement with said bearings to press said bearings against said drum whereby rotation of said drive pin frictionally induces revolution of said bearings around the inner surface of said drum.

3. In a structure of the character set forth, a flexible shaft, a driven member provided with three axially disposed slots and having a hollow central portion, tapered rollers received within said slots and mounted for limited radial movement therein, a drum enclosing said rollers, a tapered drive member engaging said rollers on the inner side thereof and forcing them outwardly against said drum, means comprising a radially flexible portion connecting said drive member and said flexible shaft, and means manually operable to effect axial movement of said drive member into or out of engagement with said rollers.

ANDREW WYZENBEEK.

REFERENCES CITED

The following references are of record in the file of this patent:

UNITED STATES PATENTS

| Number | Name | Date |
| --- | --- | --- |
| 2,110,469 | Nardone | Mar. 8, 1938 |
| 2,306,475 | Wahl | Dec. 29, 1942 |

FOREIGN PATENTS

| Number | Country | Date |
| --- | --- | --- |
| 218,262 | Great Britain | May 30, 1924 |
| 417,279 | Great Britain | Oct. 2, 1934 |